United States Patent
Kurauchi et al.

(10) Patent No.: US 10,493,991 B2
(45) Date of Patent: Dec. 3, 2019

(54) SYSTEMS FOR ENTERING AND EXITING A VEHICLE TRANSPORT MODE USING A BACKUP FUSE AND METHODS THEREOF

(71) Applicant: Honda Motor Co., Ltd., Tokyo (JP)

(72) Inventors: Atsushi Kurauchi, Tochigi (JP); Kevin Hawkins, Yorba Linda, OH (US); Charles J Franklin, II, Huntington Beach, CA (US); Kiyomi Catalina Ito, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 15/837,274

(22) Filed: Dec. 11, 2017

(65) Prior Publication Data
US 2019/0176825 A1    Jun. 13, 2019

(51) Int. Cl.
| | |
|---|---|
| G06F 19/00 | (2018.01) |
| B60W 30/182 | (2012.01) |
| B60T 8/1755 | (2006.01) |
| G06Q 50/30 | (2012.01) |
| B60W 50/035 | (2012.01) |

(52) U.S. Cl.
CPC ......... B60W 30/182 (2013.01); B60T 8/1755 (2013.01); B60W 50/035 (2013.01); G06Q 50/30 (2013.01); B60W 2540/06 (2013.01); Y02T 10/7005 (2013.01)

(58) Field of Classification Search
CPC ............. B60W 30/182; B60W 50/035; B60W 2540/06; B60T 8/1755; G06Q 50/30; Y02T 10/7005

USPC ........ 123/198 D, 198 DB, 198 DC; 701/107, 701/29.1, 29.4, FOR. 101
See application file for complete search history.

(56) References Cited

U.S. PATENT DOCUMENTS

| | | | |
|---|---|---|---|
| 6,536,261 B1 * | 3/2003 | Weldon | F02M 25/0809 123/520 |
| 6,759,760 B2 | 7/2004 | Gaynier et al. | |
| 7,463,281 B2 | 12/2008 | Luskin et al. | |
| 8,473,153 B1 | 6/2013 | Lickfelt | |
| 8,688,310 B2 | 4/2014 | Brunou et al. | |
| 8,983,711 B2 | 3/2015 | Brunou et al. | |
| 9,180,845 B2 | 11/2015 | Fazzalari et al. | |
| 2003/0234580 A1 * | 12/2003 | Gaynier | H02J 9/002 307/85 |
| 2011/0106330 A1 * | 5/2011 | Lickfelt | B60L 1/00 700/297 |

(Continued)

Primary Examiner — Hai H Huynh
Assistant Examiner — Gonzalo Laguarda
(74) Attorney, Agent, or Firm — Honda Patents & Technologies North America, LLC; Aaron C. Fong

(57) ABSTRACT

The systems and methods provided herein are directed to enabling a vehicle to enter into and/or exit from a transport mode using a backup fuse. The vehicle may enter into the transport mode from a normal mode when an ignition of the vehicle transitions from off to on if the backup fuse has been removed and the vehicle has been placed in park or neutral. The transport mode may, in part, reduce electrical loads and power as well as limit other components of the vehicle during shipping. The dealer, or other party, may remove the transport mode when the vehicle arrives and is ready to be sold. The vehicle may exit the transport mode when the backup fuse has been re-installed and the fuel cap or lid has been removed or opened, thus returning the vehicle to the normal mode.

14 Claims, 7 Drawing Sheets

(56) References Cited

U.S. PATENT DOCUMENTS

| | | |
|---|---|---|
| 2013/0249279 A1 | 9/2013 | Sogabe |
| 2015/0197160 A1 | 7/2015 | Buecherl |
| 2015/0377347 A1 | 12/2015 | Fischer |
| 2016/0214459 A1 | 7/2016 | Sawyer et al. |

\* cited by examiner

SYSTEMS FOR ENTERING AND EXITING A VEHICLE TRANSPORT MODE USING A BACKUP FUSE AND METHODS THEREOF

BACKGROUND

Manufactured vehicles may spend a large amount of time in storage and transit before or after arriving at a vehicle dealership. Depending on the length of time, electrical loads may drain the battery prior to the vehicle arriving at the dealership. Components within the vehicle may also be affected during transit. For example, shocks within the vehicle may be over exerted during transportation. Speed and power configurations may be damaged as well. To overcome these concerns, vehicle manufacturers have developed transport modes.

In a transport mode, low power electrical configurations may be implemented to reduce power consumption. For example, a transmission control unit may be completely shut down to save power. Parameters within the vehicle may also be controlled to reduce the amount of damage caused by vibration of the vehicle when shipped. A stiffer suspension may be used to mitigate rough terrain when being transported. Speed and power configurations may be reduced to ensure that the vehicle may be driven a short distance.

Prior to being shipped, the vehicle may be placed into transport mode and before being sold or used, the vehicle may exit the transport mode and be placed into a normal mode. Manufacturers, suppliers, dealerships or other parties may use different operations to have the vehicle enter and exit the transport mode. For example, the vehicle may enter and/or exit the transport mode by starting the engine, activating hazard lights, pressing a brake pedal and/or pressing and holding the start/stop button. Some transport modes may be entered and/or exited through a specialized tool. Other more automated methods may include over-the-air updates where once the vehicle is at a location, as detected by a global positioning system (GPS), software may be downloaded to exit the transport mode.

The described operations may be complicated requiring multiple steps to both enter and/or exit the transport mode. Drawbacks may include the shipment of the vehicle in a transport mode regardless if the vehicle has been completely inspected. Furthermore, vehicles may be inadvertently sent without being placed into transport mode. The present disclosure provides systems and methods thereof that address these concerns. Other benefits and advantages will become clear from the disclosure provided herein and those advantages provided are for illustration.

BRIEF SUMMARY

According to one exemplary embodiment, a method for placing a vehicle into a transport mode that limits functions of the vehicle is provided. The method may include determining whether a backup fuse has been removed, determining whether a gear has been placed in park or neutral and activating the transport mode when an ignition transitions from off to on if the backup fuse has been removed and the gear has been placed in park or neutral.

According to another exemplary embodiment, a vehicle in a transport mode limiting functions of the vehicle is provided. The vehicle may include a gear, an ignition and a backup fuse. In addition, the vehicle may include a control system entering the transport mode when the ignition transitions from off to on if the backup fuse has been removed and the gear has been placed in park or neutral.

According to yet another exemplary embodiment, a vehicle computing system is provided. The system may include at least one processor and a memory operatively coupled to the processor, the memory storing program instructions that when executed by the processor, causes the processor to perform processes. The processes may include establishing a transport mode limiting functions to the vehicle, determining whether a backup fuse has been installed, determining whether a fuel cap or lid has been opened and exiting the transport mode when the backup fuse has been installed and the fuel cap or lid has been opened.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, the systems and methods provided herein are directed to enabling a vehicle to enter into and/or exit from a transport mode using a backup fuse. The vehicle may enter into the transport mode from a normal mode when an ignition of the vehicle transitions from off to on if the backup fuse has been removed and the vehicle has been placed in park or neutral. The transport mode may, in part, reduce electrical loads and power as well as limit other components of the vehicle during shipping. The dealer, or other party, may remove the transport mode when the vehicle arrives and is ready to be sold. The vehicle may exit the transport mode when the backup fuse has been reinstalled and the fuel cap or lid has been removed or opened, thus returning the vehicle to the normal mode.

Figure 1:
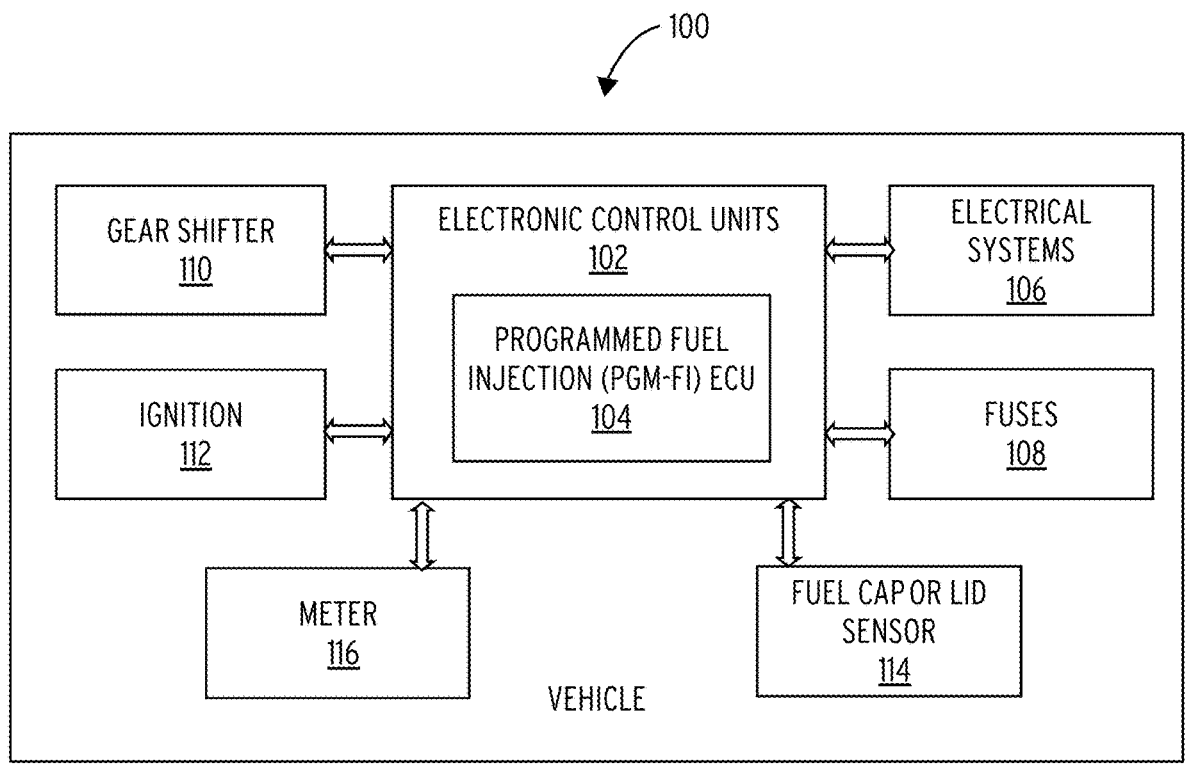
FIG. 1 is a schematic diagram of illustrative vehicle components for entering and/or exiting a transport mode in accordance with one aspect of the present disclosure.
Figure 2:
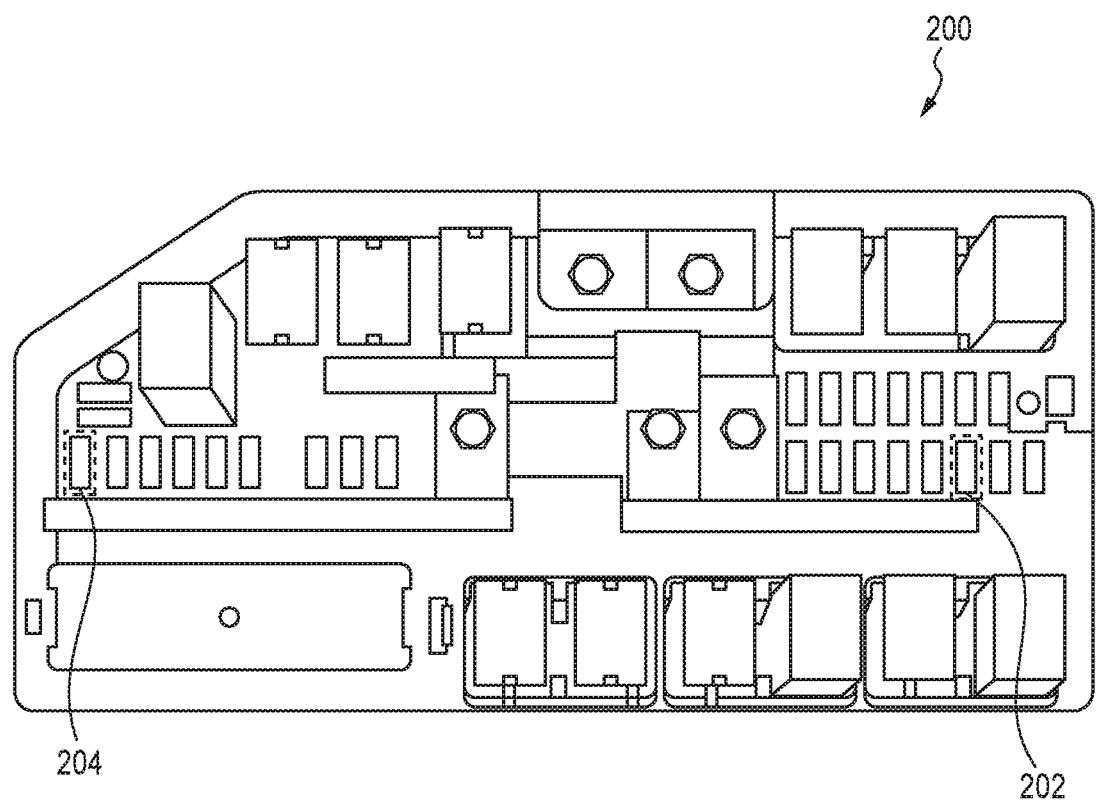
FIG. 2 is a schematic diagram of an illustrative backup fuse for controlling the transport mode in accordance with one aspect of the present disclosure.
Figure 3:
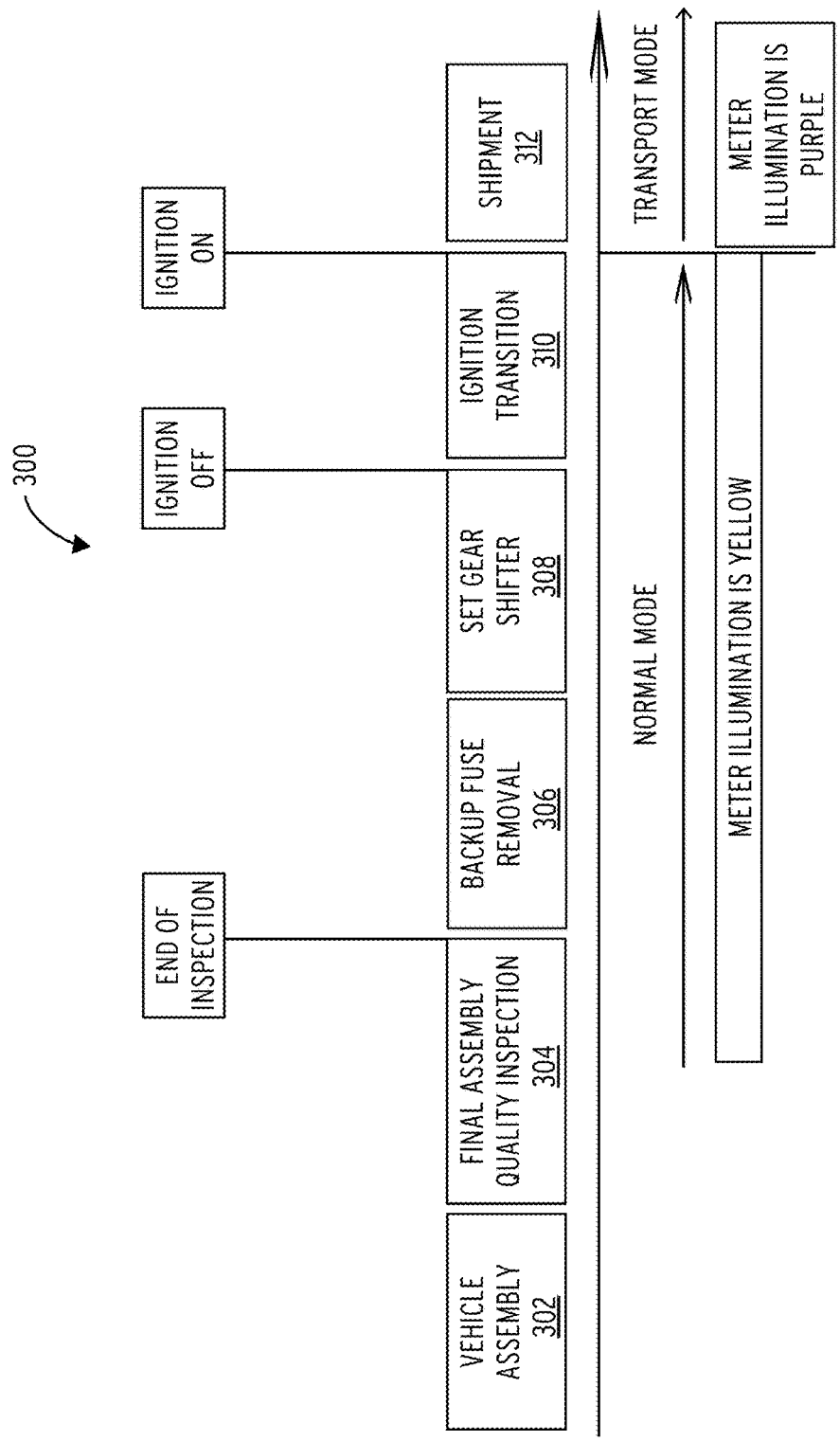
FIG. 3 is a schematic diagram of an exemplary transport mode activation process using the backup fuse in accordance with one aspect of the present disclosure.
Figure 4:
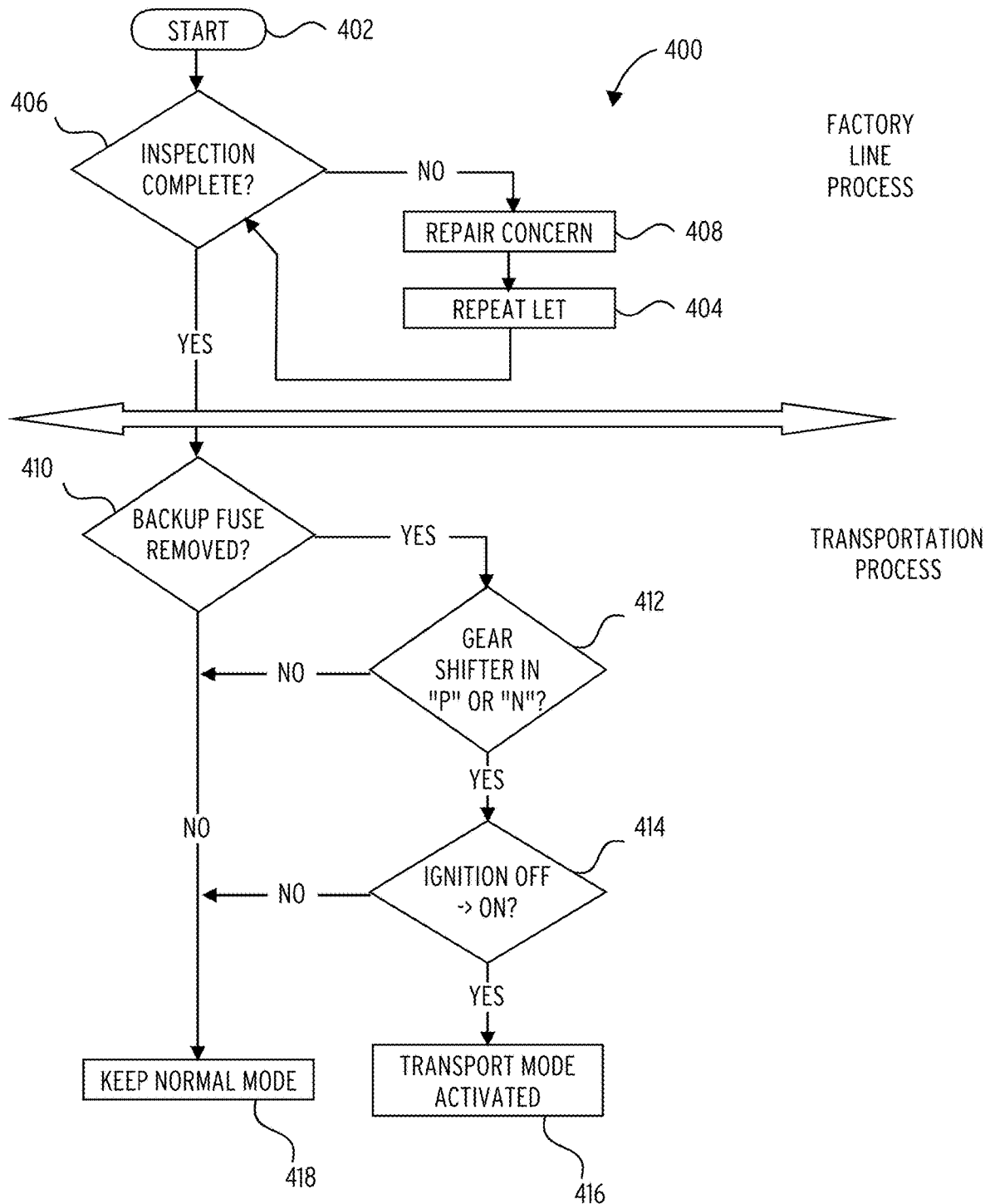
FIG. 4 is an exemplary flow chart showing illustrative processes for setting the transport mode in accordance with one aspect of the present disclosure.
Figure 5:
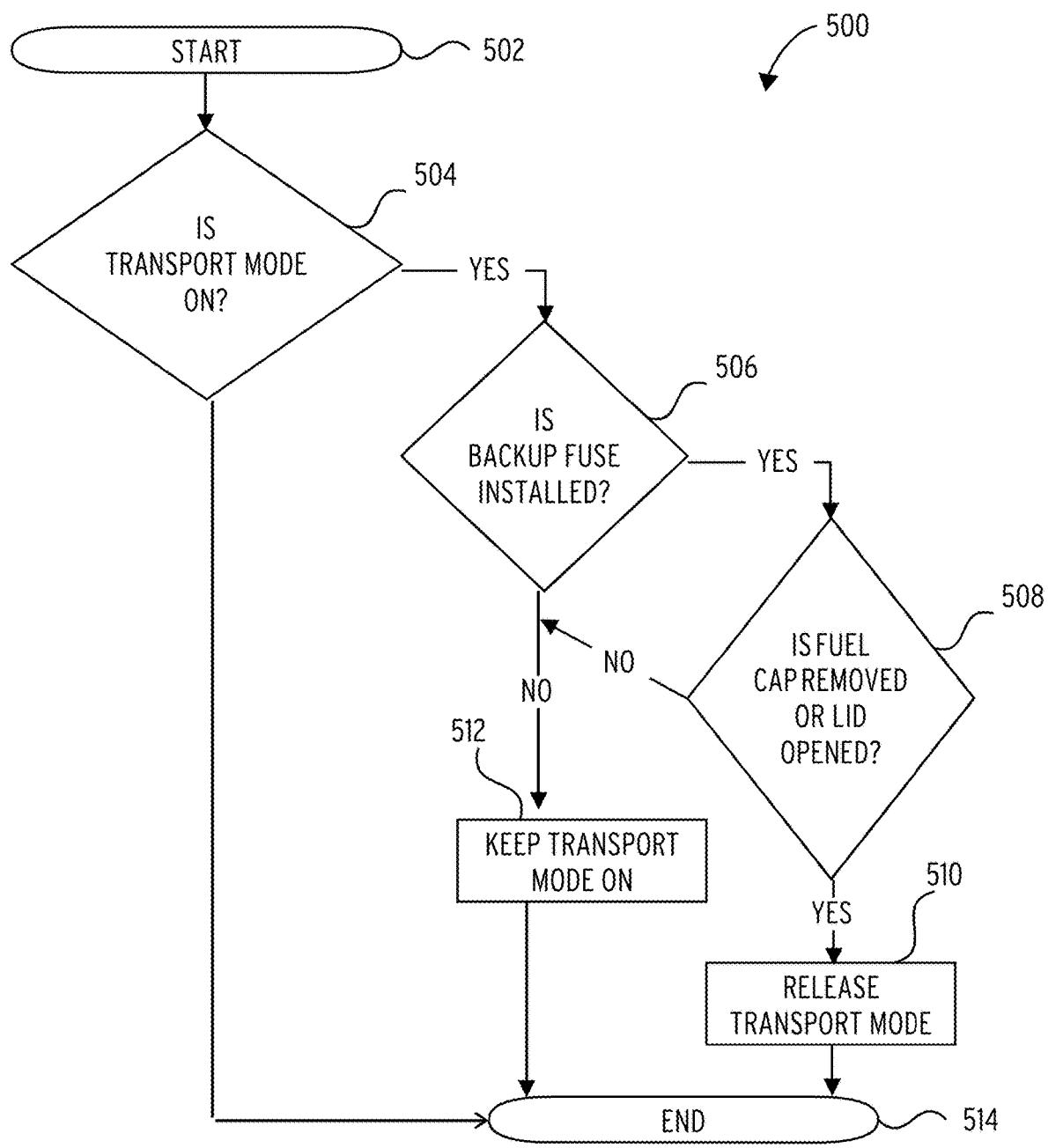
FIG. 5 is an exemplary flow chart showing illustrative processes for exiting the transport mode in accordance with one aspect of the present disclosure.
Figure 6:
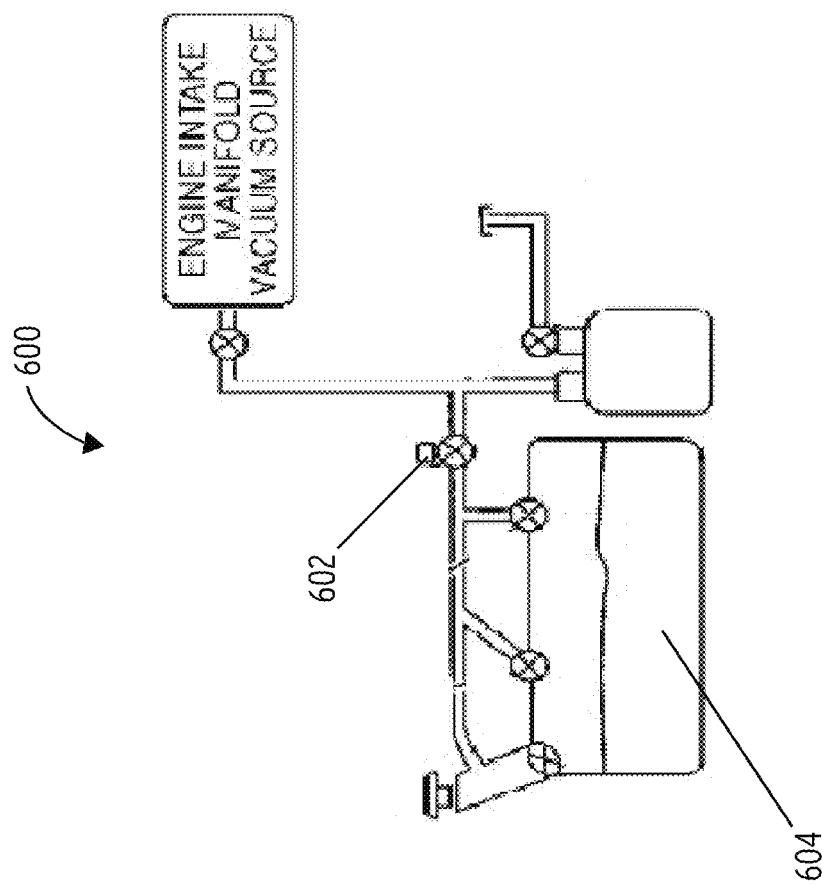
FIG. 6 is a schematic diagram of illustrative vehicle components for determining whether a fuel cap has been removed through a pressure sensor for exiting the transport mode in accordance with one aspect of the present disclosure.
Figure 7:
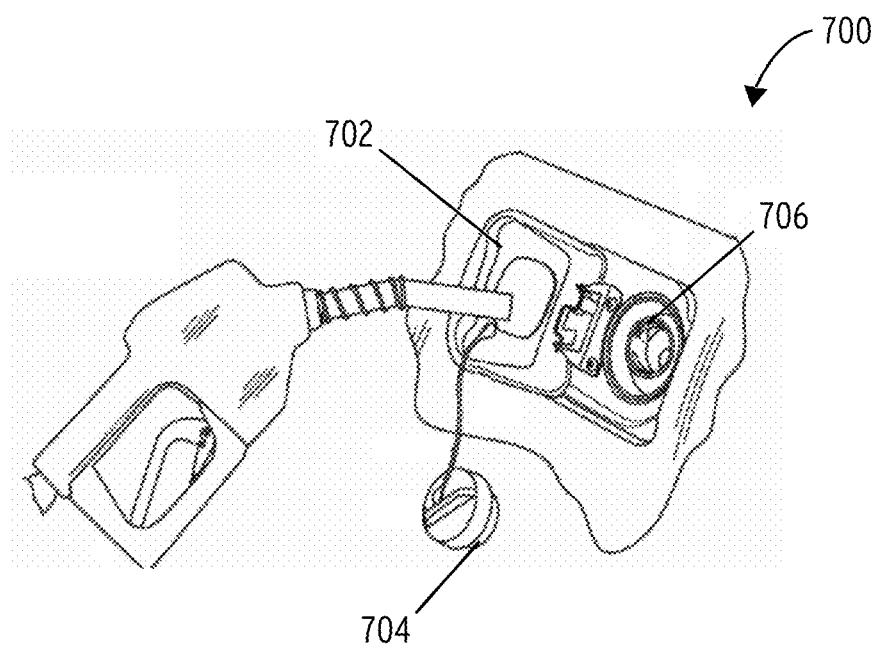
FIG. 7 is a schematic diagram of illustrative vehicle components for determining whether a fuel cap has been removed or lid has been opened through sensors on a fuel housing for exiting the transport mode in accordance with one aspect of the present disclosure.

Numerous other modifications or configurations to the system and methods thereof will become apparent from the description provided below. Advantageously, the system may remove overly complex processes for the vehicle either to enter the transport mode or exit the transport mode. Furthermore, and by requiring the use of the backup fuse, the vehicle may be properly verified and checked before shipped. Other advantages will become apparent from the description provided below. FIGS. 1 and 2 will show components within the vehicle to enter and exit the transport mode. FIGS. 3 and 4 depict exemplary processes for entering the transport mode while FIG. 5 provides processes for exiting the transport mode. FIGS. 6 and 7 describe illustrative sensors that may be used for exiting the transport mode in accordance with embodiments of the present disclosure.

Turning now to FIG. 1, a schematic diagram of illustrative vehicle components for entering and/or exiting a transport mode in accordance with one aspect of the present disclosure is provided. The vehicle 100 may include, but is not limited to, electronic control units (ECUs) 102 (which may include a programmed fuel injection (PGM-FI) ECU 104), Electrical Systems 106, Fuses 108, gear Shifter 110, ignition 112, fuel cap or lid Sensor 114 and/or vehicle meter 114. Fewer or more components may be provided within the vehicle 100 and the vehicle 100 is not limited to those components shown. The components may be connected through a bus or other connection via a wireline or wirelessly.

The ECUs 102 of the vehicle 100 may be programmed to place the vehicle 100 into the transport mode, normal mode and/or variation thereof. One or many ECUs 102 may be provided within the vehicle 100. The ECUs 102 may be vehicle control systems for receiving input and providing output as well as managing the data. The ECUs 102 may include at least one processor and memory. Computer programs may be typically stored in the memory of the ECUs 102 until they are ready for execution, at which time the programs are brought into the memory so that they can be directly accessed by the processor. The processor may select a part of memory to read and/or write by using an address that the processor gives to the memory along with a request to read and/or write. The reading and interpretation of an encoded instruction at an address causes the processor to fetch a subsequent instruction, either at a subsequent address or some other address.

Typically, ECUs 102 may be embedded systems that control one or more Electrical Systems 106 within the vehicle 100. These Electrical Systems 106 include, but are not limited to, the engine, powertrain, transmission control module, brake control module, central control module, central timing module, general electronic module, security control module, entry system modules, body control module, suspension control module and/or similar modules. The ECUs 102 may also control the telematics unit including functionality as well as power reduction on the unit.

The ECUs 102 may be programmed to place the Electrical Systems 106 of the vehicle 100 in a sleep state or transport mode to reduce power consumption and thereby preserve life within a battery of the vehicle 100 while providing the vehicle 100 with limited functionality. For example, the ECUs 102 may place limits, through an engine control, such that the vehicle 100 may be driven for a short distance. Other limits may be placed on the vehicle's maximum speed limit, for example, vehicles 100 in transport mode may be limited to travelling below fifty (50) miles per hour.

One of the ECUs 102, a programmed fuel injection (PGM-FI) ECU 104 may be controlled to adjust certain functions of the vehicle 100 when in and out of the transport mode. The PGM-FI ECU 104 may control a digital electronic fuel injection system that is used for internal combustion engines which injects the proper amount of fuel per cylinder based on specific engine data. By adjusting parameters for the PGM-FI ECU 104, the vehicle's speed or power may be reduced or increased.

Other Electrical Systems 106 may be limited in a transport mode. In one example, functionality for the telematics unit may be limited by the ECUs 102. Power may be limited to the telematics unit or completely shut down while in transport mode. The ECUs 102 may reduce lights on the vehicle 100. Some lights may be shut down or their intensity may be reduced. In another example, other ECUs 102 may limit the doors and sunroof from being opened.

After vehicle production, the ECUs 102 may go to a "zero" or default setting. The default setting may be associated with an initial start. History, or other memory, may be reformatted or erased indicating the default setting. As differentiated from a non-default setting, and when power is disconnected to the ECUs 102, the ECUs 102 may maintain their history and information prior to the power removal. The default setting may thus indicate a clean history and designated start of life after production.

Continuing with FIG. 1, Fuses 108 may protect wiring and the Electrical Systems 106 of the vehicle 100 as well as the ECUs 102. The backup fuse, a specific fuse within the Fuses 108, may set at least one of the ECUs 102 to a default setting when removed. Thus, and in order to check whether the backup fuse has been removed, the vehicle 100 may verify that the at least one of the ECUs 102 is in a default setting as removing the backup fuse clears or sets the ECUs 102 to that default setting.

When the backup fuse has been removed and causes the at least one of the ECUs 102 to be placed in a default setting, the vehicle 100 may enter into the transport mode. This alone, or in combination with other processes, may cause the vehicle 100 to enter into the transport mode. For purposes of illustration, and in embodiments of the present disclosure, when the backup fuse has been removed, the gear Shifter 110 may also have to be set to park or neutral to place the vehicle 100 into the transport mode.

The gear Shifter 110, or gear selector, may be used to shift or change from one gear to another in the vehicle 100. The shifter 110 may be used in a manual, semi-automatic, or automatic transmission. For manual transmissions, the shifter 110 may be used with a clutch pedal to disengage the engine from the drivetrain and wheels of the vehicle 100. For manual transmissions, the shifter 110 may be placed into park, reverse, neutral, drive, 1st gear, $2^{nd}$ gear, $3^{rd}$ gear or other drive gear. Additional gears may be available for the manual transmission. Automatic, semi-automatic and shifters 110 with continuously variable transmissions gearboxes typically do not use the clutch pedal. These shifters 110 may be placed into park, neutral, reverse or drive.

Placing the vehicle 100 into the transport mode may also include the use of the ignition 112, in combination with the removal of the backup fuse and placing the gear Shifter 110 into park or neutral The transport mode may be activated when the ignition 112 transitions from off to on, or from off to an awaken state. The ignition 112 places the vehicle 100 into an awaken state when the ignition 112 has been turned on. This state may be used to capture the processes described above to place the vehicle 100 into the transport mode.

The ignition 112 may place the vehicle 100 in an awaken state when the key is set at a predetermined position. For example, the key may be placed into the ignition 112 in the lock/off position. Other positions such as the accessory position, on/run position and/or start position may be used to wake up the vehicle 100 for entering the transport mode. In an illustrative example, using the accessory position, the user may wake up the vehicle 100 by placing their key into the ignition 112 at the lock/off position. The user may then turn their key counter clockwise to the accessory position for a period of time to wake up their vehicle 100 to enter in a transport mode. The transport mode may then be entered if the correct processes are followed, that is, the backup fuse has been removed and the gear shifter 104 has been placed in park or neutral.

Keyless systems for the ignition 112 such as those embedded within key fobs may be used to wake up the vehicle 100 to enter the vehicle 100 into the transport mode. A sequence pressed by the user on the key fob may be used to wake up the vehicle 100. In such variations, the transport mode may be entered and/or exited through another sequence or without waking up the vehicle 100. Alternatively, a valet key may be used. Pushbuttons may also be used for the ignition 112. Pushbuttons for awakening the vehicle 100 may be activated when the key fob is within a predetermined distance of the vehicle 100, for example, when the user is within the vehicle and the key fob is a foot away from an internal vehicle sensor.

After setting the transport mode, the ignition 112 may be typically set in an off position when transported. When the vehicle 100 arrives at the dealership or other location, and is ready to be sold or used, the vehicle 100 may then be taken or exited out of transport mode using additional processes. For illustrative purpose, the installation or re-installment of the backup fuse may be used in one process for the vehicle 100 to exit the transport mode. Reconnecting the backup fuse may cause the ECUs 102, including the PGM-FI ECU 104, to be activate as described beforehand. The reconnection may remove the default state that they were in such that they may process and take in information and other data coming from the Electrical Systems 106.

Additional processes may be used to take the vehicle 100 out of the transport mode beyond installation or re-installation of the backup fuse. In accordance with one illustration, the vehicle 100 may exit the transport mode when the fuel cap or lid sensor 116 of the vehicle 100 indicates that it has been released or opened. The fuel cap or lid sensor 116 may be a pressure sensor, which will be described in FIG. 6, or a fuel housing sensor, which will be described in FIG. 7. At least one of the ECUs 102 may determine whether the fuel cap or lid sensor 116 has been activated or released, that is, whether the fuel cap has been removed or fuel lid is opened. Typically, the fuel cap or lid Sensor 114 may be released when the user is intending to fuel their car, either through recharging via electricity or providing gas or liquid fuel.

In one embodiment, to exit the transport mode, the ignition 112 may be turned from off to on or to the awaken state. This process may capture the unique state of the release of the fuel cap or lid opened along with the installation or re-installation of the backup fuse. In another illustrative example, the fuel cap or lid Sensor 114 may be released when an interior button detecting that the user intends to open the fuel cap or lid has been pushed or activated. This in combination with the installation of re-installation of the backup fuse may remove the transport mode from the vehicle 100. The fuel cap or lid may not actually open when still in transport mode. Accordingly, the interior button for releasing the fuel cap or lid may have one function when the vehicle 100 is in transport mode and another function when in normal mode.

Those processes to enter and exit the transport mode should not be construed as limiting to the present disclosure. Furthermore, they are not necessarily tied to one another such that the described operations and/or processes are in the described order for the vehicle to enter and exit the transport mode. In one variation, for example, the ignition 112 may not need to be turned to an on or awaken state to exit the transport mode. Rather, when the backup fuse is installed and the fuel cap or lid Sensor 114 is activated, the normal mode may be set.

When the vehicle 100 transitions from normal mode to transport mode and then back to normal mode, a vehicle metermeter 116 may be used to indicate the transitions. The meter 116 may be displayed on the telematics unit and be controlled by at least one of the ECUs 102 described above. In another example, the meter 116 may be displayed on the dashboard of the vehicle 100. A dedicated space on the dashboard may be provided showing the transitions. In one example, the meter 116 may be provided off-board the vehicle 100, that is, it may be displayed on a smartphone, tablet or other personal communication device.

Transitions that are displayed on the vehicle metermeter 116 may be provided in the form of different or alternating colors. For the normal mode, the color may be in yellow and for the transport mode, the meter 116 may be displayed in purple. When entering the transport mode, a yellow color may be displayed and after commencing with the processes described above, the meter 116 may be changed to purple to indicate that it is now in the transport mode. Upon arrival of the vehicle 100, the purple color of the meter 116 may be changed back to yellow after the transport mode is exited either through those processes described above or others not provided herein. In one alternative illustration, after the vehicle 100 is taken out of the transport mode and placed into the normal mode, no color may be presented by the meter 116 and it may be left blank.

In further detail, FIG. 2 is a schematic diagram of an illustrative backup fuse 202 for controlling the transport mode in accordance with one aspect of the present disclosure. The Fuses 108, described earlier, may be placed into a fuse box 200 which is typically located under the hood of the vehicle 100. The Fuses 108 may protect the wiring and be sized and located to protect the wire they are connected to. Typically, after final factory assembly and inspection of the vehicle 100 is completed, the vehicle 100 comes out in the normal mode with the Fuses 108 inserted including the backup fuse 202.

The backup fuse 202 when removed out of the Fuses 108 may cause at least one of the ECUs 102 to go to a default state, which may be detectable as described before. By removing the backup fuse 202 within the fuse box 200, the Fuses 108 may be prevented from draining the battery when the vehicle 100 is shipped. During shipment, the backup fuse 202 may be removed under the hood from the fuse box 200 and stored in the center console. In one embodiment, and before the vehicle 100 is shipped in transport mode, an audio fuse 204 may also be removed. The fuse 204 may remove audio functions within the vehicle 100 during the transport mode.

As the backup fuse 202 is removed, the ECUs 102 may go into the transport mode as described above. The ECUs 102 may be programmed to place the Electrical Systems 106 of the vehicle 100 in a sleep state or transport mode to reduce power consumption and thereby preserve life within a battery of the vehicle 100 while providing the vehicle 100 with limited functionality. For example, the ECUs 102 may place limits, through an engine control, such that the vehicle 100 may be driven for a short distance. Other limits may be placed on the vehicle's maximum speed limit, for example, vehicles 100 in transport mode may be limited to travelling below fifty (50) miles per hour.

FIG. 3 is a schematic diagram of an exemplary transport mode activation process 300 using the backup fuse 202 in accordance with one aspect of the present disclosure. This process may include a number of processes, but are not limited to, vehicle assembly 302, final assembly quality inspection 304, backup fuse removal 306, set gear shifter 308, ignition transition 310 and shipment 312. The processes described are provided for illustrative purposes and should not be construed as limiting. Fewer or more processes may also be provided.

The process 300 for transport mode activation may begin with vehicle assembly 302. During vehicle assembly 302 an assembly line may be used in which parts are created, fastened and/or welded together to make the vehicle 100. A number of work stations may exist throughout the assembly line. At each work station, a specific task and/or tasks may be performed. The workstations may be supplied with specific parts for assembly. By having these different work stations, the vehicle 100 may be produced in less time and less labor as each work station is specialized in the specific task.

At final assembly quality inspection 304, the vehicle may be heavily analyzed in the hopes to proceed without any system failures such that the vehicle 100 may be placed into the transport mode. A number of designed tests have been implemented by automotive manufacturers to determine how well a car stands up to real world and extreme use. For example, the tests may include how the vehicle 100 drives and a durability of its suspensions. Different weather conditions may also be applied to the vehicle 100 to see how a paint or interior of the vehicle 100 lasts. Testing of the airtight seals may also be determined. Other tests may be performed on the vehicle 100 and are not limited to those described herein.

Upon completion of the final assembly quality inspection 304, the end of the vehicle inspection may arrive. As provided earlier, the Fuses 108, including the backup fuse 202, may be installed in the fuse box 200 at this point. The vehicle 100 may begin in the normal mode before being transitioned to the transport mode.

Continuing with the transport mode activation process 300, backup fuse removal 306 may be performed. The backup fuse 202 may be removed upon the completion of the vehicle inspection. A Line End Test (LET) may not operate if the backup fuse 202 has been removed from the vehicle 100. This test may be used for a final quality check and may be used at an end of full assembly of the vehicle 100. The purpose of the LET may be to catch certain defects that are within parts at the end of assembly. Thus, the LET may be used before the fuse 202 is removed.

When the backup fuse 202 has been removed, the ECUs 102, as described earlier, may go into a default setting. The default setting may be detectable indicating that the fuse 202 has been taken out. With the backup fuse 202 removed, the vehicle 100 may go into the transport mode, or may go into transport mode with the additional processes used in the transport mode activation process 300.

During set gear shifter 308, of the transport mode activation process 300, the shifter 110 may be placed in park, as indicated by "P", or neutral, as indicated by "N". The set gear shifter 308 may include the use of the clutch or non-clutch implementations as discussed above. The ECUs 102 within the vehicle 100 may be used to detect whether the correct shifting occurs to place the vehicle 100 into the transport mode. Alternatively, mechanical sensors may be used to determine whether the vehicle 100 may have been placed into park or neutral.

Ignition transition 310 may capture or lock the transport mode into place. The ignition 112, when transitioned from an off state to an on state, may bring the vehicle 100 into transport mode, along with the backup fuse 202 removal and the gear Shifter 110 placed into park or neutral. The ignition transition 310 may also occur when the ignition 112 is placed from an off state to an awaken state, as described above.

Shipment 312, of the transport mode activation process 300, may occur after the transport mode has been set into the vehicle 100. Shipment 312 may include storing the vehicle 100 until the vehicle 100 may be transported. For purposes of illustration, the vehicle 100 may be sent to the end user or consumer through, but not limited to, train, rail, truck or the like. The vehicle 100 may also be stored in warehouses for large period of time. These warehouses may be associated with the manufacturer, dealership or end users. Typically, shipment 312 may be characterized by the length of time it takes for the vehicle 100 to arrive to the dealership, or other party.

The transport mode activation process 300 may end at this point, as shown in FIG. 3. During the vehicle assembly 302, final assembly quality inspection 304, backup fuse removal 306, set gear shifter 308 and ignition transition 310, the vehicle metermeter 116 may be in the normal mode. In one embodiment, the normal mode on the meter 116 may be the color yellow. When the vehicle 100 transitions into shipment 312, and thereby transport mode, the meter 116 may turn to the color purple indicating that it is in transport mode.

In some implementations, the vehicle metermeter 116 may transition to different colors, patterns and/or other indicia showing the normal mode and transport mode. For example, a patchwork pattern may be shown on the meter 116 when the vehicle 100 is in the normal mode and a striped pattern may be used when in the transport mode. Gradual transitions may also be shown between the colors, patterns and/or other indicia.

In one illustrative example, different colors, patterns and/or other indicia may be used on each of the processes of the transport mode activation process 300. When the backup fuse removal 306 is performed, set gear shifter 308 is performed, ignition transition 310 is performed and shipment 312 is performed, the color, pattern and/or other indicia may change at each process. In one embodiment, if the any one of the processes is not completed, or the processes are not executed correctly, the default normal mode color, pattern and/or other indicia may be shown. In other words, and for example, if the user fails to start the ignition 112 on within a period of time, the meter 116 may display the default for the normal mode. The same may be true when exiting the transport mode.

FIG. 4 is an exemplary flow chart showing illustrative processes 400 for setting the transport mode in accordance with one aspect of the present disclosure. Fewer or more processes may be provided and the processes 400 shown should not be construed as limiting. The first set of processes may show factory line processes while the second set of processes may show transportation processes.

The processes 400 may begin at block 402, which may be within the factory line processes. At decision block 404, a determination on whether an inspection has been completed may be made. The inspection may be completed by automated or manual methods as described above, for example, running LET. Manual methods may also be used, for example, running light checks and/or driving the vehicle 100 in specified areas of the factory for testing.

When the inspection is incomplete, a repair concern at block 406 may be made. In one exemplary embodiment, the repair concern may be produced by a diagnostic tool that is able to access vehicle data within the vehicle 100. Other forms of determining the cause of concern are within this scope of this disclosure. For example, indicators within the dashboard may provide the concern. Telematics devices within the vehicle 100 may also be used to diagnose the concern.

At block 408, LET may be executed. From earlier above, LET may run diagnostics on the vehicle 100 to determine the concern. The backup fuse 202 may be required to be placed into the fuse box 200 for LET to run otherwise, it typically may not. Other Fuses 108 may also be required to be in place before LET may run or be executed. Control may return to decision block 404.

When the inspection has been completed at decision block 404, the processes 400 may proceed to the transportation processes, that is, placing the mode in the transport mode. At decision block 410, a determination may be made on whether the backup fuse 202 has been removed. In one illustration, this determination may be made by determining whether at least one of the ECUs 102 is set to a default setting, as removing the backup fuse 202 may cause the at least one of the ECUs 102 to revert to a default setting. As provided earlier, the default setting may indicate that the vehicle 100 is new or has been assembled recently. The lack of data or memory may indicate the default setting.

When the backup fuse 202 has not been removed, the vehicle 100 may continue to operate in the normal mode. That is, the vehicle 100 may operate normally through its Electrical Systems 106. In the alternative, and when the backup fuse 202 has been removed, the processes 400 may go to decision block 412, where the processes 400 may determine whether the gear Shifter 110 is in park or neutral. This determination may be made by automated or manual methods discussed above.

The processes 400 may continue to be in the normal mode when the gear Shifter 110 is in neither the park nor neutral setting. In the alternative, and now when the gear Shifter 110 is in park or neutral and the backup fuse 202 has been removed, the processes 400 proceed to decision block 414, where the processes 400 may determine whether the ignition 112 transitions from off to on, or from off to awaken.

The processes 400 may proceed to block 418, and continue in normal mode, when there is no ignition transition. In one embodiment, a predetermined period of time may elapse before the processes 400 by default continue in the normal mode at block 418. For example, this period of time may be thirty (30) seconds. This period of time may allow the removal of accidentally setting the transport mode. When the ignition 112 transitions from off to on, or awaken, the transport mode may be activated at block 416. Thus, the ECUs 102 may be set at the correct settings to prepare the vehicle for shipment. The ignition 112 may then be set back to an off state.

Upon arrival at the point of sale, or other location, the vehicle 100 may be placed back into the normal mode, that is, removal of the transport mode. The vehicles 100 may be shipped from the factory to their final point of sale, or other location, with the transport mode set. It may be required to properly release the transport mode disabling the transport mode.

FIG. 5 is an exemplary flow chart showing illustrative processes 500 for exiting the transport mode in accordance with one aspect of the present disclosure. Fewer or more processes may be provided and the processes 500 shown should not be construed as limiting. Furthermore, while setting the transport mode and removing it may use the backup fuse 202 described herein, these two processes 400 and 500 should not be construed as tied to each other, that is, each of the processes 400 or 500 may be their own unique systems.

The processes 500 may begin at block 502. At decision block 504, the processes 500 may determine whether the transport mode is on, or has been set. When the transport mode is not on, the processes 500 may be provided to block 514 where they end. In the alternative, and when the transport mode has been set on, the processes 500 may continue to decision block 506. At decision block 506, the processes 500 may determine whether the backup fuse 202 has been installed, or re-installed. This determination may be made based on verifying whether at least one of the ECUs 102 has been set to a default setting. The default setting may indicate that the backup fuse 202 is missing or still removed.

When the backup fuse 202 has not been installed, the processes 500 may proceed to block 512, where the transport mode may be kept on. The processes 500 may end at block 514. In the alternative, and when it is determined that the backup fuse 202 has been installed at decision block 506, a determination on whether the fuel cap has been removed or lid has been opened may be made at decision block 508. As will be shown in the following FIGS. 6 and 7, the fuel cap removal or lid opened may be determined through a variety of different systems and methods.

A period of time may be used to determine whether the fuel cap has been removed or lid has been opened. If the fuel cap has not been removed or lid has not been opened within the period of time, the processes 500 may continue to block 512 where the transport mode is kept on. The processes 500 may end at block 514. In the alternative, and when the fuel cap has been removed or lid has been opened, the transport mode may be released at block 510. In one further embodiment, the transport mode may not be released until the ignition 112 is set from an off to on, or an awaken state. The processes 500 may end block 514.

FIG. 6 is a schematic diagram 600 of illustrative vehicle components for determining whether a fuel cap has been removed through a pressure sensor 602 for exiting the transport mode in accordance with one aspect of the present disclosure. Specifically, this refers to decision block 508 from FIG. 5. The pressure sensor 602 may be part of the fuel pump assembly and may be mounted on top of the tank 604 or inside the tank 604.

In one illustrative example, the pressure sensor 602 may be part of an evaporative emission system and may read pressure in the fuel system to detect evaporative leaks, such as through the removed fuel cap. Fuel vapors may be contained in the evaporative emission system, and removal of the fuel cap may allow vapors to escape into the atmosphere. The pressure sensor 602 may be connected to the engine computer, or ECUs 102 and a determination of the vapors may be made. Through the pressure sensor 602, the determination may be made whether the fuel cap is on or off.

The above implementation shows one example of determining whether a fuel cap is on to determine whether to release the transport mode. FIG. 7 is a schematic diagram 700 of illustrative vehicle components for determining whether a fuel cap 704 has been removed or lid has been opened through sensors on a fuel housing for exiting the transport mode in accordance with one aspect of the present disclosure. The diagram 700 provides a number of different embodiments for detecting whether the fuel cap 704 has been removed or fuel door lid 702 has been opened. The embodiments may be used, but is not necessarily limited to, gasoline, hydrogen and electric stations.

In one embodiment, a sensor may be placed on the fuel door lid 702, and/or a corresponding sensor on the vehicle 100. When closed, the fuel cap 704 may be assumed to be in place and closed such that the fuel cap 704 has not been removed. In the alternative, the opening of the fuel door lid 702 may create a positive on the processes 500 described above for decision block 508, that is, the lid 702 has been opened. In one embodiment, the vehicle 100 may recognize that the fuel door lid 702 is opened when a pressure sensor associated with the ECUs 102 detects that there is a low pressure within the fuel tank. This may be particularly useful in cap-less fuel tanks.

An internal sensor 706 within the well may be placed into the vehicle 100 to detect whether the fuel cap 704 has been removed, according to one embodiment of the present disclosure. The fuel cap 704 may have a sensor and when tied to the internal sensor 706, or closed on one another, a negative indication may be given such that the fuel cap 704 may show that it has not been removed. In accordance with the processes 500 described above, the vehicle 100 may continue to be in transport mode.

In one embodiment, the vehicle 100 may have an internal button or lever for opening the fuel cap. This may replace the fuel door lid 702 or fuel cap 704 from actually opening. When the backup fuse 202 is installed, and the button or lever is activated, the vehicle 100 may exit the transport mode and go into normal mode.

By releasing the transport mode, the vehicle 100 may increase its speed and drive under normal operation. By placing the backup fuse 202, and removing the fuel cap 704 or opening the fuel lid 702, the vehicle 100 may then be transitioned into normal mode without special procedures as the backup fuse 202 should be placed in as part of sale procedures. This may apply to electric, combustion or hybrid vehicles where they use backup fuses 202 as well as have fuel caps 704 or lids 702.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for placing a vehicle into a transport mode that limits functions of the vehicle, the method comprising:
   determining whether a backup fuse has been removed;
   determining whether a gear has been placed in park or neutral; and
   activating the transport mode when an ignition transitions from off to on if the backup fuse has been removed and the gear has been placed in park or neutral.

2. The method of claim 1, comprising receiving the vehicle in a normal mode before activating the transport mode.

3. The method of claim 1, wherein determining whether the backup fuse has been removed comprises verifying whether at least one electronic control unit has been set to a default state.

4. The method of claim 1, wherein activating the transport mode comprises adjusting parameters on a programmed fuel injection electronic control unit.

5. The method of claim 4, wherein adjusting parameters on the programmed fuel injection control unit reduces speed or power.

6. The method of claim 1, comprising changing a color on a vehicle meter indicating that the vehicle is in the transport mode.

7. The method of claim 6, wherein changing the color on the vehicle meter comprises transitioning from a yellow to a purple when activating the transport mode.

8. A vehicle in a transport mode limiting functions of the vehicle comprising:
   a gear;
   an ignition;
   a backup fuse; and
   a control system entering the transport mode when the ignition transitions from off to on if the backup fuse has been removed and the gear has been placed in park or neutral.

9. The vehicle of claim 8, wherein the control system is in a normal mode before entering the transport mode.

10. The vehicle of claim 8, wherein the control system determines if the backup fuse has been removed by verifying whether at least one electronic control unit has been set to a default state.

11. The vehicle of claim 8, wherein the control system exits the transport mode when the backup fuse has been installed and a fuel cap is removed or lid is opened.

12. The vehicle of claim 11, wherein the control system determines that the fuel cap is removed through a pressure sensor on the fuel housing.

13. The vehicle of claim 11, wherein the control system determines that the fuel lid is opened through a pressure sensor associated with an electronic control unit.

14. The vehicle of claim 8, comprising a meter changing colors when the vehicle enters into the transport mode.

* * * * *